United States Patent Office 3,595,905
Patented July 27, 1971

3,595,905
PREPARATION OF UNSATURATED ESTERS
Robert G. Schultz, St. Louis, Mo., assignor to
Monsanto Company, St. Louis, Mo.
No Drawing. Filed Apr. 18, 1966, Ser. No. 545,521
Int. Cl. C07c 67/04
U.S. Cl. 260—497A          7 Claims

ABSTRACT OF THE DISCLOSURE

The present invention relates to the preparation of unsaturated esters from olefines utilizing a palladium catalyst which includes various palladium compounds, which may also be used in combination with metal salts. Unsaturated esters having a high degree of terminal substitution relative to internal substitution are obtained.

---

The present invention relates to the preparation of unsaturated esters from olefins. It is an object of the invention to prepare unsaturated esters from olefins by the use of a selective catalyst. It is also an object of the invention to prepare unsaturated esters from alpha olefins to obtain a product having a high degree of terminal substitution relative to internal substitution by the use of such catalyst.

It is another object of the invention to employ various palladium compounds, and also combinations of metal salts with the palladium compounds as catalysts for the said preparation of unsaturated esters in order to direct the course of the various possible chemical reactions which occur in the preparation of unsaturated esters from olefins.

Prior art methods for the preparation of unsaturated esters have in general been characterized by the production of internal," that is, non-terminal esters derived from carboxylic acids and unsaturated compounds. When the unsaturated compounds are alpha olefins, the products are saturated esters, while the use of acetylene compounds yields unsaturated ester. However, acetylene compounds are difficult to handle and are also extremely expensive. A further drawback to the production of unsaturated esters from acetylenes is that only the simplest acetylenes are readily available. In addition, the common methods of ester synthesis cause prior isomerization of the olefin, usually to the internal, non-alpha olefin, further reducing the amount of the most desired terminal ester.

The prior art methods of ester synthesis have yielded products which exhibit the conventional Markovnikov addition (usually by way of the formation of the more stable secondary carbonium ion). It is an object of this invention, however, to prepare esters by a method which is an anti-Markovnikov addition which is not free radical in nature.

It has now been found that the use of certain metal catalysts under specific conditions make possible the preparation of unsaturated esters without undergoing the conventional Markovnikov addition. The metal compounds which are employed in the present process include palladium compounds, for example, sodium chloropallidite, Na$_2$PdCl$_4$; palladium chloride, PdCl$_2$; palladium acetate, Pd(OC$_2$H$_3$O)$_2$; palladium sulfate, PdSO$_4$; palladium nitrate, Pd(NO$_3$)$_2$; palladium (II) diamine dichloride, (NH$_3$)$_2$PdCl$_2$ palladium acetylacetonate, Pd(C$_5$H$_7$O$_2$)$_2$ and also pi-allyl palladium chloride complexes (added to the reaction mixture as such or formed in situ from a pallidium salt, e.g., palladium chloride and the reacting olefin), for example, di-mu-chloro-di-p-allyl-di-palladium (II).

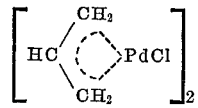

di-mu-chloro-di-(1,3-dimethyl-pi-allyl)-di-palladium (II)

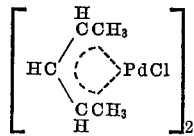

di-mu-chloro-di-(1,2,3-trimethyl-p-allyl)-di-palladium (II)

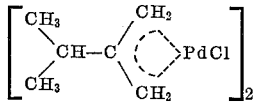

di-mu-chloro-di-(1,1,2-trimethyl-pi-allyl)-di-palladium (II)

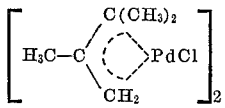

di-mu-chloro-di-(2-n-propyl-pi-allyl)-di-palladium (II)

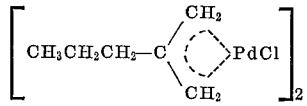

di-mu-chloro-di-(1-methyl-3-n-propyl-pi-allyl)-di-palladium (II)

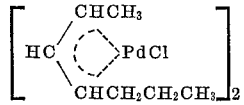

di-mu-chloro-di-(1,2,3-trimethyl-pi-allyl)-di-palladium (II)

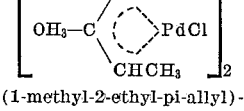

di-mu-chloro-di-(1-methyl-2-ethyl-pi-allyl)-di-palladium (II)

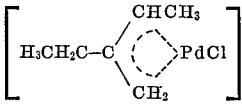

and di-mu-chloro-di-(2-methyl-di-cyclohexenyl)-di-palladium (II)

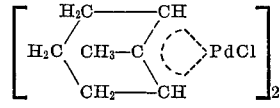

The designation, palladium (II) refers to the valence of the palladium. The proportion of palladium compound employed is not critical, but may vary broadly from 0.1 to 0.001 mole per mole of olefin feed.

The palladium compound is used in the presence of a carboxylic acid ion, which may be provided as the palladium carboxylate or as an additive carboxylic acid salt which further contributes carboxylate ions, for example, lithium, sodium, magnesium, calcium, strontium, barium, aluminum, zinc and cadmium salts of the carboxylic acids, for example, acetic acid or stearic acid as discussed below.

The palladium compound is also preferably used in combination with a copper salt which may have the same or a different anion from those set forth above for the palladium (II). For example, palladium acetylacetonate may be used with cupric chloride. The proportion of copper relative to palladium on a molar basis is at least 4, preferably from 4 to 100 moles of copper ion relative to the palladium (II) ion.

It has been found that the control of the various chemical reactions in the vinylation (oxidative esterification) of acids by alpha olefins to achieve an anti-Markovnikov addition requires the use of specific limitations as to the metal salts which are present as is set forth in greater detail below. However, in order to show the distinction over the prior art, the use of palladium chloride with sodium acetate to effect esterification of ethylene according to the prior art is shown in the following equation, where the symbol OAc refers to acetate (e.g. NaOAc is sodium acetate):

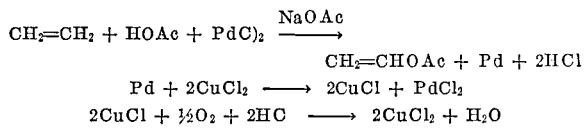

It may be seen that palladium chloride is not a classical catalyst in the above reactions, but that it acts in a catalytic manner via copper and oxygen catalyzed regeneration steps. The copper salt is not an essential component in the present improved process but it is often desirable to have the copper salt present to aid in the regeneration of the palladium compound, so that smaller amounts of the expensive palladium compound are necessary.

The products of vinylation of higher olefins have not been generally described in the literature with the exception of the products from propylene which have been found to give exclusively isopropenyl acetate (a non-terminal ester). In contrast to such simple Markovnikov addition, the present invention makes it possible to achieve high levels of terminal substitution from alpha olefin feedstocks rather than the internal substitution previously observed. The present process while especially advantageous with terminally unsaturated feedstocks is also useful in the vinylation of internal olefins since the present process avoids isomerization.

The present invention of ester production from olefins and carboxylic acids is carried out with the use of a critical mole relationship between the carboxylate ion, for example, the acetate ion which is present, relative to the concentration of mineral acid anions, for example, fluoride, chloride, bromide, iodide, sulfate or nitrate ions, and also including the acetylacetonate ion which in the present case is considered to be a mineral acid anion, typically expressed as the acetate/chloride ratio. In general, the ratio should be at least 0.01:1, a preferred range being from 0.06:1 to 30:1, on a mole basis. However, it has also been found that specific ranges within the broader ranges favor the production of simple esters or of high boiling products composed of higher esters and combined forms as may be desired. Thus, the specific range which favors terminal esterification (herein also referred to as vinylation), is from 1:1 to 30:1, a preferred range being from 1.5:1 to 30:1 and with a more preferred range being from 2:1 to 3:1. A specific range for the obtainment of high boiling products, also called "high boilers," is from 0.01:1 to 0.9:1, a preferred range being from 0.06:1 to 0.9:1, and a more preferred range being from 0.15:1 to 0.45:1.

The aforesaid critical ranges of carboxylate/mineral acid anion refers to the carboxylic ion, for example, the acetate or stearate ion which is added to the reaction mixture as a metallic salt, e.g., sodium acetate. By mineral acid anions are meant all other anions added to the reaction system in addition to the aforesaid carboxylate anions, for example, palladium chloride, palladium nitrate or palladium sulfate, and also from cupric chloride when this is employed. The liquid medium, for example, acetic acid does not supply any substantial proportion of acetate ion (or more generally carboxylate ion) as is shown, for example, by the very low dissociation constant of acetic acid. The proportion of carboxylic acid used as the reaction medium is not a critical variable, but should be at least 50% by weight of the total reaction system.

The high boilers referred to above in general consist of products of what appears to be later addition of the elements of the carboxylic acids or water to the unsaturated ester product. Specific isomers which have been isolated from the reaction of hexene-1, for example, are:

hexane 1,2-diol-diacetate, 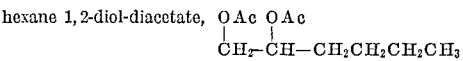

hexane 1,2-diol-1-acetate, 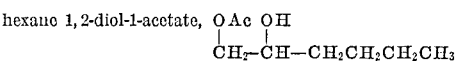

hexane 1,2-diol-2-acetate, and hexylidene diacetate,

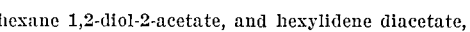

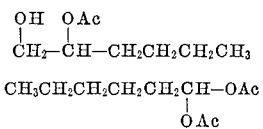

The high boilers may be pyrolytically decomposed to afford greater yields of unsaturated esters or to yield aldehydes or ketones. Alternately, these high boiling products may also be employed in the preparation of other products such as plasticizers.

The unsaturated esters of the present invention are useful per se, for example as monomers to be polymerized to obtain polymers. When the unsaturated esters are hydrogenated, the corresponding saturated esters are obtained. Such esters are useful as plasticizers, heat transfer fluids, etc. For example, di-octenyl phthalate is hydrogenated to di-octyl phthalate which is a useful plasticizer for polyvinyl chloride.

The present saturated esters, or saturated analogs are readily saponified, such as by use of 10% aqueous sodium carbonate, or transesterified, such as by use of ethyl alcohol and a sulfuric acid catalyst to obtain the alcohol (from the saturated ester), or carbonyl compound (from the unsaturated ester via the enol).

The olefins which are of utility in the preparation of unsaturated esters in accordance with the present invention are the aliphatic and aromatic mono- and diolefins having from 2 to 20 carbon atoms, for example, ethylene; propylene; butenes, for example, butene-1, and butene-2; pentenes, for example, pentene-1 and pentene-2; hexenes, for example, 4-methylpentene-1, trans- and cis-4-methylpentene-2, 2-methylpentene-2, and 2 - methylpentene - 1, hexene-1, cis- and trans-hexene-2, cis- and trans-hexene-3; 2,3-dimethylbutene-2; 2,3-dimethylbutene-1; cyclohexene; heptenes, for example, heptene-1; alpha-methyl-styrene, beta-methylstyrene; and 1-methylcyclohexene; and octenes, for example, octene-1 and cyclo-octenes; and other mono-olefins. Di-olefins, for example, 1,5-hexadiene, 2,5-dimethyl-1,5-hexadiene, 4-vinylcyclohexene, norbornadiene, and others may be similarly used.

The carboxylic acid component which is employed in the practice of the present invention and which enters into the aforesaid critical ratio of carboxylate/mineral acid anion is provided by the palladium and other metal carboxylate salts of aliphatic acids having from 1 to 20 carbon atoms, for example, formic, acetic, propionic, butyric, hexanoic, decanoic, stearic, and cyclohexanecarboxylic acid. Diacids, such as succinic and glutaric acids; and aromatic acids, such as benzoic, and phenylacetic acids may also be employed. The carboxylate ion referred to in the above ratio is supplied as the aforesaid palladium carboxylate. However, this ion may also be introduced into the reaction system as another metal carboxylate, for example sodium acetate, lithium acetate, potassium acetate or calcium acetate. Although it is not intended to be limited thereto, for convenience, the present products will be discussed in detail in terms or hexenyl acetate.

The proportion of olefin and acid component used in the preparation of the desired unsaturated esters is not critical, and either component may be used in excess of the stoichiometric proportion. The carboxylic acid component, such as acetic acid can be used as a solvent as well as a reactant. Other liquids such as dimethylformamide, dimethylacetamide, dimethylsulfoxide and acetonitrile can be used as solvents.

The present reaction is carried out under anhydrous conditions, using dried or anhydrous reactants, e.g., glacial acetic or other carboxylic acid. Even low levels of water cause side reactions such as the formation of aldehydes and ketones; to maintain strictly anhydrous conditions, it is possible to take up small amounts of water by addition of part of the carboxylic component as the anhydride, e.g., acetic, succinic or benzoic anhydride. The temperature may vary broadly in accordance with the volatility of the olefin, e.g., to provide higher temperatures for higher boiling olefins, although the general temperature is from 20° C. to 200° C. A preferred range is 60° C to 150° C., and a more preferred range is 90° C. to 125° C., utilizing vacuum, atmospheric, or super-atmospheric conditions. The reaction may be conducted either in a batch or continuous manner. In the case of a batch reaction the time of reaction is not a critical variable. As little as 1 min. reaction time is sufficient to achieve appreciable levels of conversion although a period of at least 5 min. is preferred.

The following examples illustrative specific embodiments of the present invention. While the production of hexenyl acetate is shown in greatest detail, the scope of the invention is not limited thereto, but is in accordance with the generic statement of the invention set forth above.

EXAMPLE 1

A 300 ml. autoclave specially constructed of titanium metal alloy is used in these studies. The reactor is charged with reactants (less than olefin) and maintained under a nitrogen atmosphere. The autoclave is assembled, and stirring and heating started. After the autoclave is stabilized at the desired temperature (approximately 1 hour) the olefin is introduced into the reactor. The experiment is terminated at the desired time by removing the heating mantle and apply an ice bath to cool the autoclave body to room temperature. The following is a typical run charge, using an acetate ion/chloride mole ratio of 2.25:

5.0 grams anhydrous $CuCl_2$, 37.4 millimoles
14.5 grams anhydrous $NaC_2H_3O_2$, 177 millimoles
0.364 gram $PdCl_2$, 2.06 millimoles
100 ml. glacial acetic acid
10 ml. hexene-1 (mono-olefin), 80 millimoles The cooled reaction mixture from the autoclave is filtered to remove solids. Distilled water is added to the filtrate and the product is isolated from the aqueous acid phase with benzene extractions. Benzene is removed by distillation and the residue (containing some benzene, hexenyl acetates and some high boilers) is examined by gas chromatography to determine the distribution (relative amounts) of products. Distillation affords pure samples of mixed hexenyl acetates and of saturated hydroxy acetates (high boilers) in substantial yields. Product distribution within the hexenyl acetate fraction is determined by catalytic hydrogenation of the double bond, followed by gas chromatographic determination of relative amounts of saturated ester isomers.

When the above experimental procedure is carried out, using 177 millimoles of lithium butyrate with 100 ml. of anhydrous butyric acid, and 80 millimoles of dodecene-1, the product dodecenyl butyrate is obtained in substantial yield with a major proportion of terminal unsaturation.

In the same manner, the use of the above experimental procedure, using 177 millimoles of magnesium propionate with 100 ml. of anhydrous propionic acid, and 80 millimoles of butene-2 results in production of butenyl propionate in substantial yield, with the retention of the original molecular configuration.

EXAMPLE 2

Other metal salts, which in this example are provided as acetate salts, may be used in the practice of the present invention in place of the sodium salt employed in Example 1. The table below lists results obtained for a series of metal acetates when used in the procedure described in Example 1 (AcO/Cl is the mole ratio of acetate ion to chloride ion ratio (and yields are in mole percent).

TABLE OF RESULTS OF VARYING CARBOXYLIC ACID SALT

| Metal acetate salt | AcO/Cl | Relative mole percent $C_6H_{11}OAc$ | Relative mole percent high boilers |
|---|---|---|---|
| LiOAc | 0.62 | 91.8 | 8.2 |
|  | 1.24 | 99.1 | 0.9 |
| NaOAc | 0.62 | 69.7 | 30.3 |
|  | 1.24 | 100 | 0 |
| $Mg(OAc)_2$ | 0.62 | 25.4 | 74.6 |
|  | 1.24 | 31.0 | 69.0 |
| $Ca(OAc)_2$ | 0.62 | 53.8 | 46.2 |
|  | 1.24 | 68.0 | 32.0 |
| $Sr(OAc)_2$ | 1.24 | 74.4 | 25.6 |
| $Ba(AAc)_2$ | 1.24 | 91.5 | 8.5 |
| $Zn(OAc)_2$ | 1.24 | 71.7 | 28.3 |
| $Cd(OAc)_2$ | 1.24 | 100 | 0 |
| $Al(OAc)_3$ | 1.24 | 59.4 | 40.6 |

EXAMPLE 3

The effect of variation of acetate to chloride ratio on the relative amounts of hexenyl acetate and high boiler and on the amount of terminal vinylation when using sodium acetate as the acetate ion source is shown in the table below. The procedure used is that described in Example 1, above.

| AcO⊖/Cl⊖ ratio | Distribution of products (percent) | | Mole percent 1-acetate in— | |
|---|---|---|---|---|
| | $C_6H_{11}OAc$ isomers | High boilers | $C_6H_{11}OAc$ | Total product |
| 0.15 | 20.0 | 80.0 | 66.3 | 13.3 |
| 0.30 | 19.9 | 80.1 | 77.3 | 15.6 |
| 0.45 | 40.1 | 59.9 | 61.8 | 24.7 |
| 0.50 | 59.2 | 40.8 | 59.0 | 34.9 |
| 0.62 | 69.7 | 30.3 | 50.2 | 35.0 |
| 0.75 | 73.5 | 26.5 | 50.7 | 37.2 |
| 1.00 | 91.7 | 8.3 | 38.5 | 35.3 |
| 1.25 | 100 | 0 | 41.0 | 41.0 |
| 1.50 | 100 | 0 | 57.5 | 57.5 |
| 1.75 | 100 | 0 | 68.8 | 68.8 |
| 2.00 | 100 | 0 | 67.5 | 67.5 |
| 2.25 | 100 | 0 | 72.0 | 72.0 |
| 2.45 | 100 | 0 | 73.8 | 73.8 |
| 2.75 | 100 | 0 | 68.8 | 68.8 |
| 3.20 | 100 | 0 | 71.8 | 71.8 |
| 3.70 | 100 | 0 | 70.0 | 70.0 |
| 30* | 100 | 0 | 55.5 | 55.5 |

*$Cu(OAc)_2$ used in place of $CuCl_2$.
NOTE.—All reactions run with $PdCl_2$-$CuCl_2$-NaOAc-(hexene-1)-HOAc at 115° for 15 min.

EXAMPLE 4

The procedure of Example 1 is repeated with the exception that magnesium acetate is used in place of sodium acetate. The results obtained with different acetate to chloride ratios are tabulated below (as mole percent):

| AcO⊖/Cl⊖ ratio | Distribution of products (percent) | | Percent 1-acetate in— | |
|---|---|---|---|---|
| | $C_6H_{11}OAc$ isomers | High boilers | $C_6H_{11}OAc$ | Total product |
| 0.3 | 26.0 | 74.0 | 82.0 | 21.3 |
| 0.6 | 25.4 | 74.6 | 87.5 | 28.4 |
| 1.2 | 31.0 | 69.0 | 79.8 | 24.8 |
| 1.8 | 37.2 | 62.8 | 75.9 | 28.2 |
| 2.4 | 48.0 | 52.0 | 67.2 | 32.2 |
| 3.0 | 53.8 | 48.2 | 65.3 | 35.2 |

EXAMPLE 5

The procedure of Example 1 is repeated with the exception that calcium acetate is used in place of sodium acetate. The results obtained with different acetate to chloride ratios are tabulated below (as mole percent):

| AcO⊖/Cl⊖ ratio | Distribution of products (percent) | | Percent 1-acetate in— | |
|---|---|---|---|---|
| | C₆H₁₁OAc isomers | High boilers | C₆H₁₁OAc | Total product |
| 0.3 | 21.3 | 78.7 | 8.0 | 18.7 |
| 0.6 | 53.8 | 46.2 | 79.3 | 42.6 |
| 1.2 | 68.0 | 32.0 | 59.5 | 40.5 |
| 1.8 | 82.6 | 17.4 | 54.0 | 44.6 |
| 2.4 | 96.2 | 3.8 | 51.8 | 49.8 |
| 3.0 | 100 | 0 | 52.0 | 52.0 |

EXAMPLE 6

The procedure of Example 1

(system=PdCl₂+CuCl₂+NaOAc with OAc/Cl ratio=2.45) is repeated with the exception that various hexene isomers are employed instead of hexene-1. The results showing high specificity of attack on the original input olefin in the presence of the acetate chloride combination without prior isomerization of the olefin, are tabulated below (as mole percent):

| Olefin | Product distribution (percent) | | Acetate distribution (percent) | | |
|---|---|---|---|---|---|
| | C₆H₁₁OAc | High boiler | 1-OAc | 2-OAc | 3-OAc |
| Hexene-1 | 100 | 0 | 73.8 | 23.3 | 2.9 |
| Cis and trans hexene-2 | 100 | 0 | 4.2 | 83.3 | 12.5 |
| Trans hexene-3 | 100 | 0 | 0 | 19.3 | 80.7 |

EXAMPLE 7

The procedure of Example 1 is repeated with the exception that various hexene isomers are employed in place of hexene-1 and that rhodium trichloride, a well known, powerful isomerization catalyst is added in equivalent mole amounts to the palladium dichloride. The results showing high specificity of attack in the presence of the acetate chloride combination, still without prior isomerization of the olefin, are tabulated below (as mole percent):

(System: PdCl₂:RhCl₃ (1:1)+CuCl₂+NaOAc (OAc/Cl ratio=2.45))

| Olefin | Product distribution (percent) | | Acetate distribution (percent) | | |
|---|---|---|---|---|---|
| | C₆H₁₁OAc | High boiler | 1-OAc | 2-OAc | 3-OAc |
| Hexene-1 | 100 | 0 | 71.4 | 25.1 | 3.5 |
| Cis and trans hexene-2 | 100 | 0 | 3.0 | 83.8 | 13.2 |

EXAMPLE 8

The procedure of Example 1 is repeated with the exception that various hexene isomers are are employed in place of hexene-1 and that 1-methyl-3-ethyl-pi-allylpalladium chloride (C₆H₁₁PdCl₂)₂ is employed in place of palladium dichloride. The results showing high specificity of attack on the olefin without olefin isomerization are tabulated below (as mole percent):

(System: (C₆H₁₁PdCl)₂ᵃ with CuCl₂+NaOAc (OAc/Cl ratio=2.45))

| Olefin | Product distribution (percent) | | Acetate distribution (percent) | | |
|---|---|---|---|---|---|
| | C₆H₁₁OAc | High boiler | 1-OAc | 2-OAc | 3-OAc |
| Hexene-1 | 100 | 0 | 64.0 | 32.9 | 3.1 |
| Cis and trans hexene-2 ᵇ | 100 | 0 | 0 | 87.5 | 12.5 |

ᵃ 1-methyl-3-ethyl-pi-allylpalladium chloride.
ᵇ Run for 2 hrs. at 95° C.

EXAMPLE 9

The procedure of Example 1 is repeated using sodium chloropalladite (Na₂PdCl₄) in place of palladium dichloride, at an acetate to chloride ratio of 0.59. The isolated product consists of 65.0% hexenyl acetates (containing 49.5% primary acetates and 50.5% internal acetates) and 35.0% high boiling products. The amount of primary (terminal) acetate in the total product is 32.2%.

EXAMPLE 10

The procedure of Example 1 is repeated using palladium (II) diamine dichloride, (NH₃)₂PdCl₂ in place of palladium dichloride at an acetate to chloride ratio of 0.62. The isolated product consists of 81.6% hexenylacetates (containing 44.8% primary acetates and 55.2% internal acetates) and 18.4% high boiling products. The amount of primary (terminal) acetate in the total product is 37.6%.

EXAMPLE 11

The procedure of Example 1 is repeated using 1-methyl-3-ethyl-pi-allyl palladium chloride (C₆H₁₁PdCl)₂ in place of palladium dichloride at an acetate to chloride ratio of 0.61. The isolated product consists of 81.6% of hexenylacetates (containing 35.1% primary acetates and 64.9% internal acetates) and 18.4% high boiling products. The amount of primary (terminal) acetate in the total product is 28.6%.

EXAMPLE 12

The procedure of Example 1 is repeated using palladium acetate, Pd(OC₂H₃O)₂ in place of palladium dichloride and cupric acetate Cu(OC₂H₃O)₂ in place of cupric chloride. The acetate to chloride ratio is infinite since no chloride ion is present. The isolated product consists of 91.1% hexenylacetates (containing 55.5% primary and 44.5% internal acetates) and 8.9% high boiling products. The amount of primary (terminal) acetate in the total product is 50.6%.

EXAMPLE 13

The procedure of Example 1 is repeated using palladium acetylacetonate,

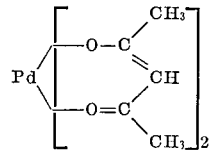

in place of palladium dichloride, and cupric acetylacetonate,

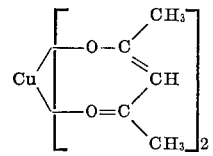

in place of cupric chloride, at an acetate to acetylacetonate of 0.62. The isolated product is a mixture of hexenylacetates and hexenyl acetylacetonates, no high boiling products being isolated. Of the hexenyl acetates, it is established that 68% are primary (terminal) acetates and 32% are secondary (internal) acetates.

EXAMPLE 14

The procedure of Example 1 is repeated using palladium sulfate, PdSO₄ in place of palladium dichloride at an acetate to sulfate ratio of 1.24. The isolated product consists of 95.0% hexenyl acetates and hexenyl sulfates and 5.0% high boiling products. Of the hexenyl acetates it is estimated that 35% are primary (terminal) acetate and 65% are secondary (internal) acetates.

EXAMPLE 15

The procedure of Example 1 is repeated using palladium nitrate, Pd(NO₃)₂ in place of palladium dichloride, and cupric nitrate, Cu(NO₃)₂ in place of cupric chloride at an acetate to nitrate ratio of 0.62. The resulting product consists of 38.0% hexenyl acetates and hexenyl nitrates and 62.0% high boiling products.

EXAMPLE 16

The procedure of Example 1 is repeated using an increased amount of palladium chloride and omitting all cupric chloride. The acetate to chloride ratio is 2.45. The product consists only of hexenyl acetates of which 60.9% are primary (terminal) acetates and 39.1% are secondary (internal) acetates, thereby showing that an important component for this reaction is the palladium salt. By using copper salts the amount of palladium salt necessary to make a given amount of ester is greatly reduced.

EXAMPLE 17

The procedure of Example 1 is repeated using rhodium trichloride in place of palladium dichloride at an acetate to chloride ratio of 2.25. The product (obtained in very low yield) consists entirely of hexenyl acetates of which only 10.2% are primary (terminal) acetates, the balance 89.8% being secondary (internal) acetates. This example also demonstrates the unique nature of palladium in this reaction. (Palladium chloride at this ratio gives 73.8% primary product.)

EXAMPLE 18

The procedure of Example 1 is repeated using nickel chloride, $NiCl_2$ in place of cupric chloride at an acetate to chloride ratio of 0.62. The isolated product consists entirely of hexenylacetates of which only 18.3% are primary (terminal) acetates.

EXAMPLE 19

The procedure of Example 1 is repeated using ferric chloride, $FeCl_3$ in place of cupric chloride at an acetate to chloride ratio of 0.62. The isolated product consists of 71.4% hexenyl acetates, containing 19.3% primary (terminal) and 80.7% secondary (internal) acetates and 28.6% high boiling products. The amount of primary (terminal) acetate in the total product is 13.8%. From this example and Example 18, the favored nature of cupric salts may be seen.

EXAMPLE 20

The procedure of Example 1 is repeated at various reaction times. The results are tabulated below. It may be seen that this reaction is relatively insensitive to time of reaction:

| Reaction (minutes) | 1 | 5 | 10 | 15 | 30 |
|---|---|---|---|---|---|
| Percent primary (terminal) acetate (100% hexenyl acetate. No high boilers) | 71.4 | 72.5 | 71.0 | 73.8 | 74.7 |

Note.—Acetate/chloride ratio=2.25.

EXAMPLE 21

The procedure of Example 1 is repeated at various reaction temperatures. The results are tabulated below. It may be seen that this reaction is relatively insensitive to temperature reaction.

| Reaction temperature (deg. C.) | 80 | 100 | 115 | 130 | 150 |
|---|---|---|---|---|---|
| Percent primary (terminal) acetate (100% hexenyl acetate. No high boilers) | 78.8 | 74.2 | 73.8 | 71.4 | 70.8 |

Note.—Acetate/chloride ratio=2.25.

What is claimed is:

1. A process for the preparation of unsaturated esters from hydrocarbon olefins and hydrocarbon carboxylic acids, with avoidance of isomerization which comprises admixing an olefin having from 3 to 20 carbon atoms, together with a carboxylic acid having from 1 to 20 carbon atoms, under anhydrous conditions, in the presence of a catalyst system comprising a palladium compound, a mineral acid anion, and a carboxylic acid anion, with the mole ratio of the said carboxylic acid anion to the said mineral acid anion being between 1.5:1 and 30:1.

2. Process as in claim 1 in which the said olefin is an alpha olefin.

3. Process as in claim 1 in which the said olefin is a hexene-1.

4. Process as in claim 1 in which the said carboxylic acid anion is supplied as sodium acetate, the said palladium compound is palladium chloride, and the said mineral acid anion is supplied by cupric chloride.

5. A process as in claim 1 in which the said carboxylic acid anion is supplied from a sodium carboxylate, the said palladium compound is a pi-allyl-palladium chloride complex formed in situ from palladium chloride and the said reacting olefin, and the said mineral acid anion is supplied by cupric chloride.

6. A process as in claim 2 in which the said unsaturated esters obtained from an alpha olefin are predominantly 1-esters.

7. A process as in claim 1 in which the said unsaturated esters retain the original position of the unsaturation of the said olefin, and the attachment of the ester linkage is directly at one of the olefinic carbon atoms.

References Cited

UNITED STATES PATENTS

| 3,274,238 | 9/1966 | Kojer et al. | 260—497 |
| 3,349,118 | 10/1967 | Kohll et al. | 260—497 |

FOREIGN PATENTS

| 964,001 | 7/1964 | Great Britain | 260—497 |
| 1,353,157 | 1/1964 | France | 260—497 |
| 1,355,109 | 3/1964 | France | 260—497 |
| 145,569 | 5/1962 | U.S.S.R. | 260—497 |

JAMES A. PATTEN, Primary Examiner

V. GARNER, Assistant Examiner

U.S. Cl. X.R.

260—31.2R, 410.5, 410.9N, 468R, 475N, 496R, 485N